Nov. 21, 1933.     E. E. WEMP     1,935,683
VIBRATION DAMPENER
Filed Nov. 5, 1931     2 Sheets-Sheet 1
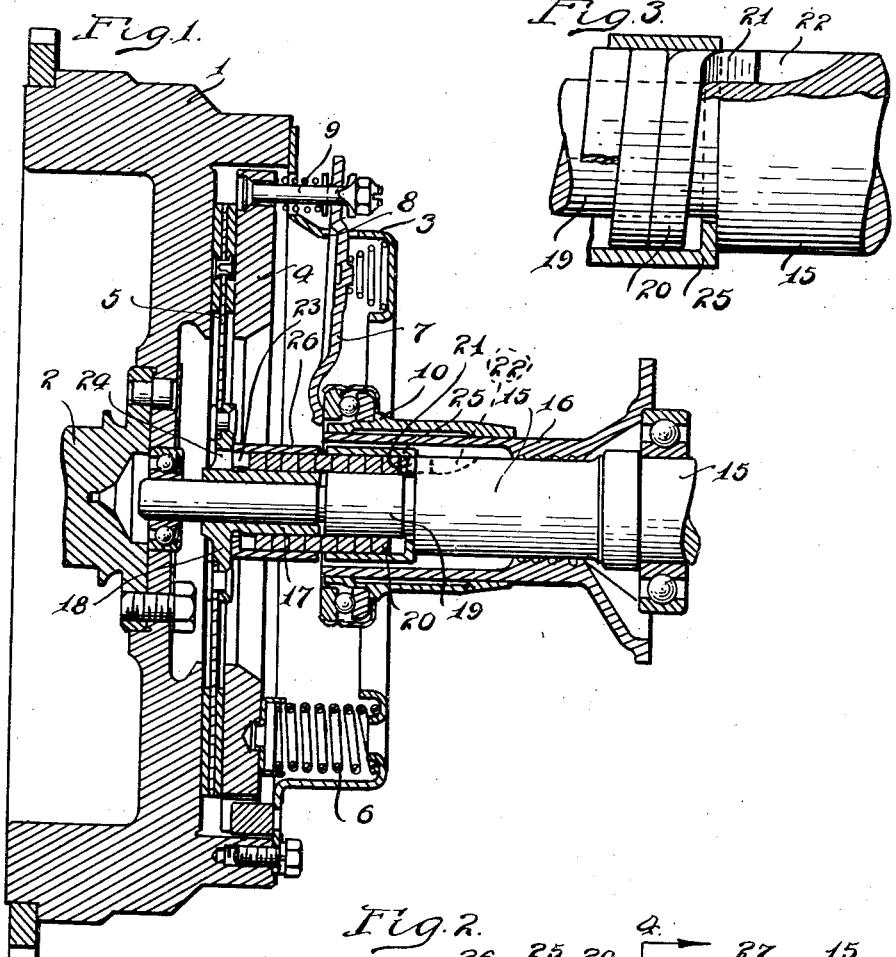
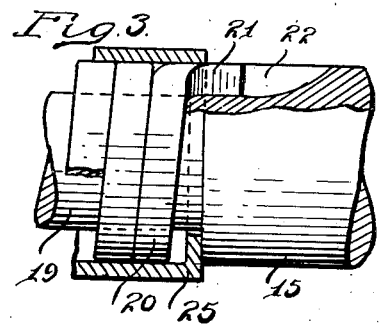
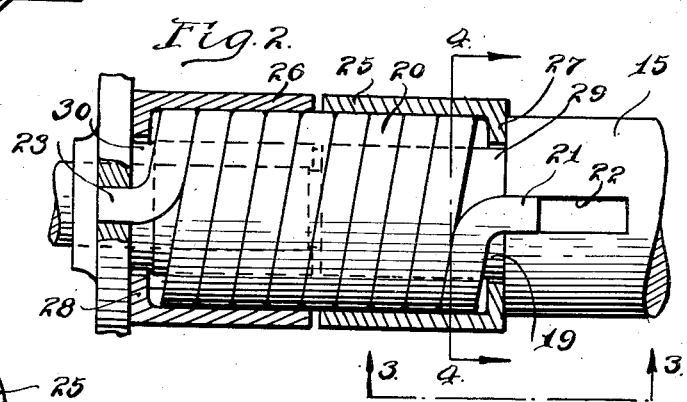
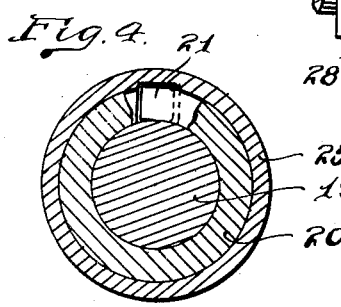
INVENTOR.
ERNEST E. WEMP.
BY Barnes and Kisselle
ATTORNEYS.

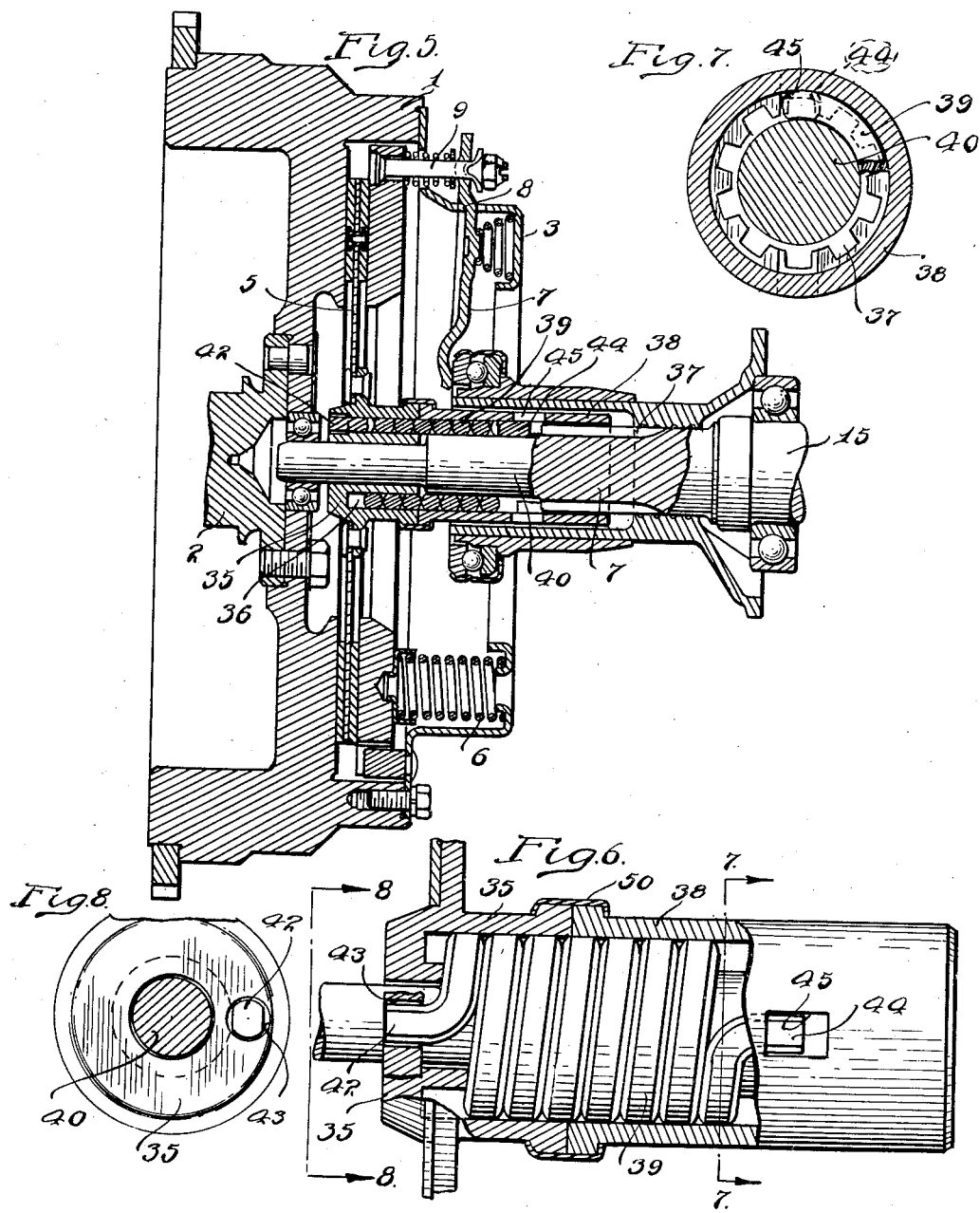

Patented Nov. 21, 1933

1,935,683

UNITED STATES PATENT OFFICE 1,935,683

VIBRATION DAMPENER

Ernest E. Wemp, Detroit, Mich.

Application November 5, 1931. Serial No. 573,112

5 Claims. (Cl. 192—68)

This invention has to do with a vibration dampener and more particularly, to a structure which may be incorporated in the line of power transmission from an internal combustion engine to parts driven thereby. The construction provides a more or less flexible or resilient driving arrangement so that engine vibrations are not transmitted in a substantial degree to the driven parts and which serves to dampen engine vibrations.

The invention is particularly adaptable for use in automotive vehicles so that engine vibrations will not be communicated thorugh the rear axle of the car and into the frame of the vehicle, although the invention may be employed wherever it is desirable in connection with engines where a problem of vibration exists. The invention particularly contemplates a construction embodying certain structural improvements and variation in arrangement of the parts over application Serial No. 544,812, filed June 16, 1931.

Fig. 1 is a sectional view taken through the structure made in accordance with the invention.

Fig. 2 is an enlarged sectional view showing in more detail some of the parts located adjacent the axial center.

Fig. 3 is an enlarged view illustrating a detailed arrangement.

Fig. 4 is a section taken substantially on line 4—4 of Fig. 2.

Fig. 5 is a sectional view taken through an arrangement constructed in accordance with the invention and showing a modified form.

Fig. 6 is a view partly in section showing structure near the axial center.

Fig. 7 is a section taken on line 7—7 of Fig. 6.

Fig. 8 is a view taken from the left hand side of Fig. 6 looking in the direction of arrows 8—8.

The invention is herein disclosed and described in conjunction with an engine flywheel, driven shaft and clutch arrangement for an automotive vehicle. The flywheel of an internal combustion engine is shown at 1, mounted on the end of the engine crank shaft 2. A clutch is shown consisting of such parts as cover plate 3, a pressure ring 4 and a driven disk 5; the driven disk is designed to be packed between the flywheel and pressure plate by packing springs 6 backed up by the cover plate. The clutch may be disengaged as by means of levers 7 which fulcrum at 8 and which connect with the pressure ring by bolts 9. The levers may be rocked on their fulcrum by an axially shiftable control member 10 which may be controlled through the means of a usual foot lever (not shown). This much of the structure may be of any desired or conventional form.

A driven shaft is shown at 15, one end of which is journaled in the flywheel, as shown, so as to be piloted thereby; the other end of which extends into a gear shift transmission housing (not shown). A housing-like projection 16 may be carried by the said gear shift housing and it is upon this part that the control member 10 may shift axially. Freely mounted upon the driven shaft 15 so that it may rotate with respect thereto, is a hub for the driven disk 5, the same being shown at 17, having a flange 18 to which the driven disk may be attached. This hub affords an exterior gripping surface. In axial alignment with this hub, the driven shaft is shaped to provide a part which affords an exterior gripping surface as shown at 19. A coil spring 20 is sleeved over the hub 17 and portion 19; one end of the spring may be associated in driving relation with the hub, and the other with the driven shaft, for which purpose one end of the spring as at 21, may be turned outwardly so as to engage in a slot 22 in the driven shaft; the other end of the spring may be turned outwardly, as at 23, for location in aperture 24 in the flange 18.

A slight amount of clearance may be provided between the inner surfaces of the spring convolutions and the outer engaging surfaces provided by the sleeve 17 and portion 19, so that when the clutch is engaged and the driven disk starts rotating, the spring 20 is wound up and contracted so as to frictionally grip the sleeve 17 and part 19 thus establishing the drive connection between these two parts. The torque during normal operation is not transmitted through the spring from end to end; the ends of the spring are connected to the respective driving and driven parts to insure winding or energizing of the spring. The driving load in normal operation is transmitted to the driven shaft by frictional engagement of the convolutions of the spring against part 19 and sleeve 17.

In the event the driven shaft tends to overrun or drive the driven disk and engine, the tendency is to unwind or expand the spring; expansion-limiting devices in the nature of sleeves may be disposed over the spring, one of these being illustrated at 25, the other at 26. These sleeves need not necessarily be keyed or otherwise fastened to the adjacent driving and driven parts. Each may have an inwardly extending flange at its end near the end of the spring so as to sort of house the spring, these flanges being shown at 27 and 28, respectively. These flanges may be provided with apertures 29 and 30 to permit the projecting ends of the spring to pass therethrough.

Accordingly, when the torque is reversed it is by means of the shaft 15 tending to drive the other parts, the spring is expanded until it is limited in such expansion by the sleeves 25 and 26. At this time the torque is transmitted through the spring from end to end as its frictional engagement with the sleeves effects no drive establishing connection between the driving and driven parts. Due to the flexing tendency of the spring oscillating movements in the flywheel and other clutch parts are permitted to exist while not occurring in shaft 15, and thus the vibrations are not telegraphed or directly communicated to the shaft 15.

In the modified form shown in Figs. 5 to 8, inclusive, the driving and driven clutch parts are substantially the same and have the same reference characters applied thereto and a redescription thereof is not necessary. In this form the hub for the driven disk may be similar to that shown in the form in Fig. 1 where it comprises two parts, namely, a hub part and a sleeve part, or it may take the form of a single hub part 35 machined to form a circular recess 36. The driven shaft 15 is splined, as at 37, and a sleeve 38 is located over the driven shaft and is connected to the driven shaft 15 by this splined connection (see Fig. 7). A coil spring 39 is located partly in the circular recess 36 and partly over part 40 on the driven shaft. The sleeve 38 and an outer wall of the circular recess 36 provide an exterior covering for the spring. One end of the spring, as at 42, may be turned outwardly through an aperture 43 in the bottom of the recess 36, while the other end, as at 44, may be turned outwardly to lock in sleeve 38. The sleeve may be apertured as at 45 at a point where the internal splines in the sleeve project beyond the external splines on the shaft 15 as shown. The spring end 44 may be fitted between spline portions bounding the aperture as shown in Fig. 7.

The inner wall of recess 36 and part 40 of the driven shaft provide exterior gripping surfaces for the spring when it is contracted around the same. The outer wall of recess 36 and the sleeve 38 provide interior engaging surfaces with which the spring may engage when it is expanded or slightly unwound.

In this form of the invention the arrangement of the parts is preferably such that there are slight clearances between the convolutions of the spring and the parts engaged thereby so that the spring may contract or expand as movements may occur between the flywheel and other driving parts relative to the driven shaft 15 in a manner similar to that above described. However, in this form, frictional clutching action of the coil spring is designed to transmit the torque in both directions. As the driven disk tends to drive, say in clockwise direction as Fig. 7 is viewed, the spring is wound up and contracted upon the inner portion of the hub 35 and upon a portion 40 of the driven shaft, thus establishing a drive connection between the driving parts and the driven shaft. When, however, the torque is reversed as by means of the driven shaft tending to overrun or drive the flywheel and other associated driving parts, the spring is unwound or expanded so that its convolutions frictionally engage the interior walls of sleeve 38 and the outer wall of recess 36. Inasmuch as sleeve 38 is directly connected with driven shaft 15 and the hub 35 directly connected with the driven disk, the reverse torque is transmitted from the driven shaft 15 to the clutch disk by the frictional engagement of said spring with said interior gripping surfaces. Thus the torque is not transmitted through the spring from end to end. The hub 35 and sleeve 38 may be held together by a shaped metal ring 50, the edges of which may be flanged over outwardly projecting flanges on these two parts as shown.

It is to be appreciated that the clutching tendency provided by the spring in normal driving operation may be accomplished by spring contraction or spring expansion. As shown in the drawings, the spring contracts around driving and driven parts in normal operation and expands when the torque is reversed. It is within the invention to reverse this arrangement so that the spring expands for effecting clutch engagement when the driving parts are tending to drive the driven shaft and which contract when the torque is reversed. This will be especially appreciated in connection with the form shown in Figs. 5 to 8, inclusive. In this form the spring 39 is a left hand spring, or in other words, has left hand windings; a right hand spring may be employed, in which event it is expanded when the torque is from the clutch to the driven shaft and contracted when the torque reverses. With other factors constant, the efficiency of a coil spring clutch of this type increases with increase of radius. Accordingly, greater torque capacity is provided when the spring is expanded against gripping surfaces than when it is contracted against gripping surfaces. Whether the spring contracts or expands under normal driving torque is subject to choice.

I claim:

1. In a vibration dampener, the combination of a driving member, a driven shaft, said member and shaft having axially aligned parts, a coil spring surrounding said parts having one end connected to the driving member and the other end connected to the driven shaft and providing the only connection between the driving member and driven shaft, said coil spring furnishing a flexible connection between the driving member and driven shaft, said coil spring being arranged to contract and grip said parts for establishing said driving connection when the applied torque is in one direction, said coil spring being adapted to expand when the applied torque is in the reverse direction, and a pair of sleeves housing the spring for limiting its expansion, said sleeves being capable of rotation relative to the driving member and driven shaft.

2. The combination with the driven disk of a clutch, a hub for the driven disk, a driven shaft journaled in the hub, said driven shaft having a part in axial alignment with the hub and of substantially the same diameter as the hub, a coil spring located over the hub and said part, one end of the spring being connected to the driven shaft and the other end of the spring being connected to the hub, and a pair of sleeves surrounding opposite end portions of the spring each having an inwardly extending flange confining the ends of the spring.

3. The combination with a driven member of a clutch, a flanged hub for the driven member, a driven shaft journaled in the hub, said driven shaft having a part in axial alignment with said hub and of substantially the same diameter, a coil spring surrounding the hub and said part, one end of the spring being disposed in a projecting manner and the flange in the hub having an aperture for receiving the same, the other end of the spring being disposed in a projecting manner, and the said driven shaft having a milled slot for receiving the same, and a pair of sleeves surrounding the spring, one at each end, and each having an inwardly extending flange at the ends of the spring, the flanges on the sleeves having apertures for the passage therethrough of the ends of the spring.

4. In a vibration dampener, the combination of a driving member having a circular recess, a driven shaft journaled therein having an integral part forming an exterior gripping surface, a separate sleeve keyed to the driven shaft and overlying said gripping surface forming a circular recess, a coil spring disposed in said circular recesses, one end of the spring being locked to the driving member, and the other end of the spring being locked to the driven member, means connecting the sleeve and driving member to prevent substantial axial shift relative to each other, said spring contracting against the inner walls of said recesses and expanding against the outer walls of said recesses in accordance with the direction of the applied torque whereby its convolutions engage the said walls and form driving connections.

5. The combination with the driven disk of a clutch, a hub for the disk having parts which form the inner and outer walls of a circular recess, a driven shaft having a part of relatively small diameter journaled in the hub and having a part adjacent the hub which has a diameter substantially equal to the diameter of the part forming the inner walls of the circular recess, a coil spring having one end connected to the hub and having some of its convolutions disposed in said circular recess and having other convolutions disposed around the part of the driven shaft which has a diameter substantially the same as the inner wall forming part of the recess, a separate sleeve surrounding the convolutions of the spring which are around the said part of the driven shaft, the end of the spring remote from the hub being turned outwardly and means for connecting this end of the spring in positive driving relation to the driven shaft.

ERNEST E. WEMP.